United States Patent
Herrero

(10) Patent No.: US 10,334,086 B2
(45) Date of Patent: Jun. 25, 2019

(54) HEADER REDUNDANCY REMOVAL FOR TUNNELED MEDIA TRAFFIC

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

(*) Notice: Subject to any disclaimer, the term of this patent is extended or adjusted under 35 U.S.C. 154(b) by 251 days.

(21) Appl. No.: 14/926,214

(22) Filed: Oct. 29, 2015

(65) Prior Publication Data

US 2017/0126849 A1    May 4, 2017

(51) Int. Cl.
| | |
|---|---|
| H04L 29/06 | (2006.01) |
| H04L 12/721 | (2013.01) |
| H04L 12/28 | (2006.01) |
| H04L 12/46 | (2006.01) |
| H04L 29/08 | (2006.01) |
| H04L 29/12 | (2006.01) |

(52) U.S. Cl.
CPC .......... *H04L 69/22* (2013.01); *H04L 12/2858* (2013.01); *H04L 12/4633* (2013.01); *H04L 45/72* (2013.01); *H04L 65/1096* (2013.01); *H04L 65/403* (2013.01); *H04L 65/608* (2013.01); *H04L 69/325* (2013.01); *H04L 61/6063* (2013.01)

(58) Field of Classification Search
USPC ...................................................... 370/474
See application file for complete search history.

(56) References Cited

U.S. PATENT DOCUMENTS

| | | | | |
|---|---|---|---|---|
| 5,987,022 A | * | 11/1999 | Geiger | H04L 12/66 370/349 |
| 9,832,170 B2 | * | 11/2017 | Bharadhwaj | G06Q 10/10 |
| 2004/0081151 A1 | * | 4/2004 | Greis | H04L 69/04 370/389 |
| 2005/0076126 A1 | * | 4/2005 | Knight | H04L 63/0281 709/227 |
| 2005/0193083 A1 | * | 9/2005 | Han | H04L 69/04 709/213 |
| 2007/0019621 A1 | * | 1/2007 | Perry | H04L 29/06027 370/352 |

(Continued)

OTHER PUBLICATIONS

3GPP TR 33.830 V0.5.0 (Nov. 2013), "Study on Firewall Traversal".*

(Continued)

*Primary Examiner* — Gregory B Sefcheck
*Assistant Examiner* — Majid Esmaeilian
(74) *Attorney, Agent, or Firm* — Potomac Law Group, PLLC

(57) ABSTRACT

A system that transmits frames by establishing a tunnel between a tunneling client of a user equipment and a tunneling server enables a redundant header removal functionality for an inner socket of the tunnel. The system receives a frame that includes an Internet Protocol ("IP") header and removes redundant information from the IP header, the removed redundant information including a source address of the frame. The system transmits the frame with a modified header after the removed redundant information over the inner socket of the tunnel.

20 Claims, 7 Drawing Sheets

(56) References Cited

U.S. PATENT DOCUMENTS

| | | | |
|---|---|---|---|
| 2010/0189103 A1* | 7/2010 | Bachmann | H04L 69/04 370/389 |
| 2010/0214978 A1* | 8/2010 | Chen | H04W 28/06 370/328 |
| 2011/0276446 A1* | 11/2011 | Gupta | G06Q 10/06 705/34 |
| 2013/0283037 A1 | 10/2013 | Katz et al. | |
| 2014/0146817 A1* | 5/2014 | Zhang | H04L 45/74 370/392 |
| 2014/0379931 A1 | 12/2014 | Gaviria | |
| 2015/0039687 A1 | 2/2015 | Waxman et al. | |
| 2016/0112372 A1* | 4/2016 | Katz | H04L 63/029 726/15 |
| 2016/0218902 A1* | 7/2016 | Hwang | H04L 27/2602 |
| 2017/0006070 A1* | 1/2017 | Lee | H04L 65/1066 |

OTHER PUBLICATIONS

H. Schulzrinne et al.; "RTP: A Transport Protocol for Real-Time Applications";Jul. 2003; 89 pages.

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

Before

After

Before

After

HEADER REDUNDANCY REMOVAL FOR TUNNELED MEDIA TRAFFIC

FIELD

One embodiment is directed generally to a communications network, and in particular, to the transmission of encapsulated media within a tunnel over a communications network.

BACKGROUND INFORMATION

Many enterprise environments have replaced their Public Switched Telephone Network ("PSTN") telephony services with telephony services that use the Internet Protocol ("IP"), commonly known as Voice over IP ("VoIP") or IP Telephony. Since IP Telephony uses an IP network as its backbone, it can provide advanced features such as video conferencing, call recording, and call forwarding.

Recently, the growing base of mobile data subscribers, the wide availability of Internet access, and the high availability of bandwidth in both fixed and mobile networks has resulted in the popularity of advanced services accessed via the Internet (known as Over-the-Top ("OTT") services). This has caused competitive service providers to offer OTT services and hence face corresponding challenges as they implement these new services.

SUMMARY

One embodiment is a system that transmits frames by establishing a tunnel between a tunneling client of a user equipment and a tunneling server. The system enables a redundant header removal functionality for an inner socket of the tunnel. The system receives a frame that includes an Internet Protocol ("IP") header and removes redundant information from the IP header, the removed redundant information including a source address of the frame. The system transmits the frame with a modified header after the removed redundant information over the inner socket of the tunnel.

DETAILED DESCRIPTION

One embodiment is a system that, before transmitting encapsulated media, or frames, over a tunnel, removes redundant header information in order to increase bandwidth. The removed information may include source address information as well as an identifier of the type of data being transmitted.

Media (i.e., speech or video) inner traffic encapsulated via Tunneled Services Control Function involves transmitting tens of real-time transport protocol ("RTP") frames per second, which requires significant bandwidth utilization. RTP frames, regardless of whether they are encrypted or not, are sent on top of the Internet Protocol ("IP") protocol introducing undesired redundancy that is a consequence of the nature of encapsulated media traffic. Each IP packet includes several fields, such as the IPv6 source address, that consume considerable bandwidth. However, in one embodiment these fields are well known to both a tunneling client as well as a tunneling server, making them ideal candidates for removal. Therefore, embodiments automatically remove this redundancy with minimal computational complexity and extremely limited memory consumption.

Figure 1:
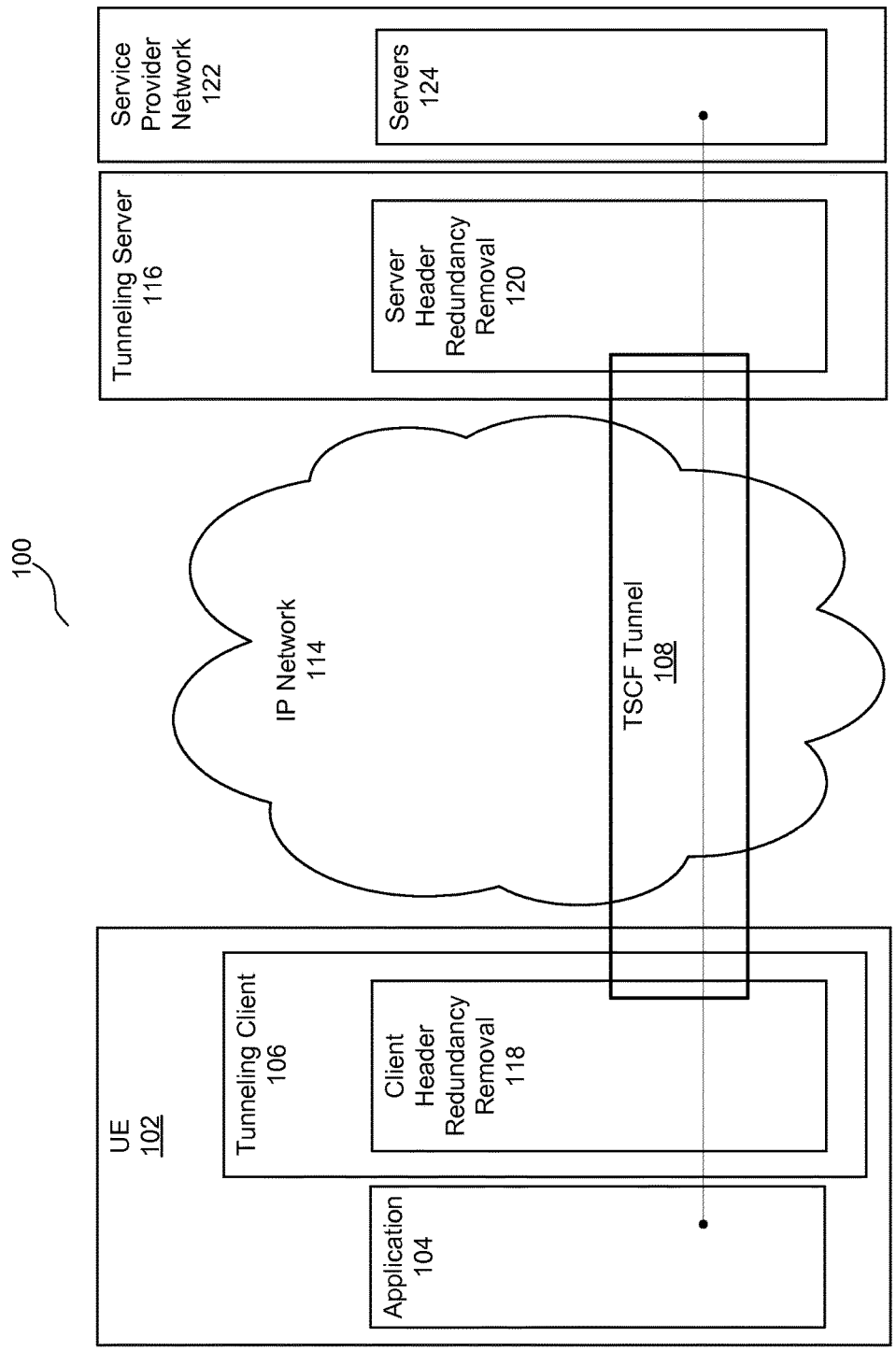
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC") 793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application 104 that may be a SIP based RTC application relying on a library such as the software development kit ("SDK") provided by the Tunneled Session Management ("TSM") solution from Oracle Corp. The TSM solution employs a client/server architecture using session border controllers ("SBCs") and client applications, such as application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by a client header redundancy removal module 118 and/or a server header redundancy removal module 120. In general, for the functionality of tunnel 108, client header redundancy removal module 118 and/or server header redundancy removal module 120 remove redundant information from encapsulated frames in order to reduce bandwidth requirements. The SDK in general provides additional APIs beyond "standard" TSCF APIs in order to implement the functionality disclosed herein.

Figure 2:
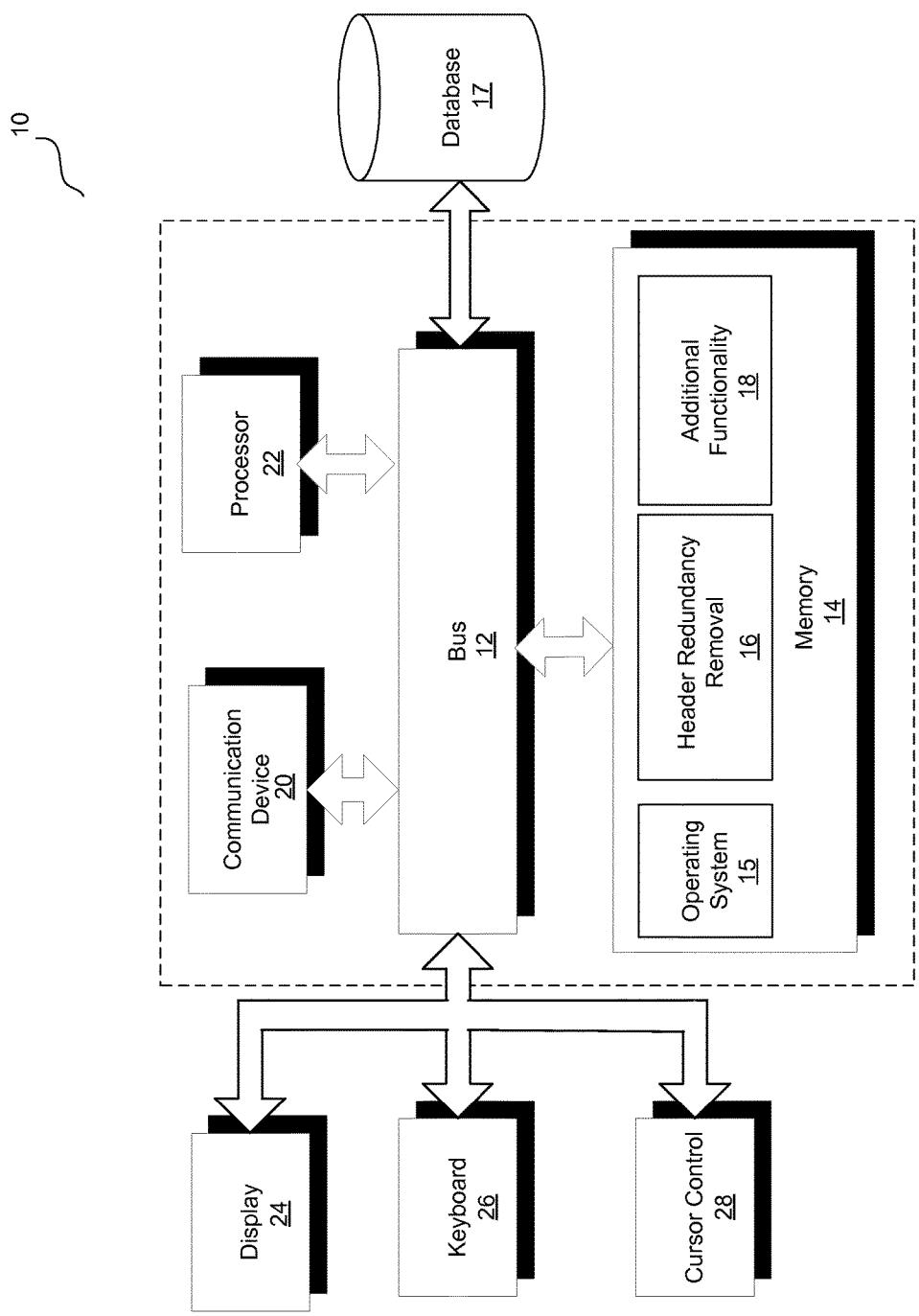
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling server 116 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a header redundancy removal module 16 for providing removal of redundant information in a header, and all other functionality disclosed herein. In one example embodiment, header redundancy removal module 16 may implement tunneling server 116 of FIG. 1 in conjunction with one or more remaining elements of FIG. 2. System 10 can be part of a larger system, such as added functionality to the "Acme Packet 6300" session border controller from Oracle Corp. Therefore, system 10 can include one or more additional functional modules 18 to include the additional functionality. A database 17 is coupled to bus 12 to provide centralized storage for header redundancy removal module 16 and additional functional modules 18.

In one embodiment, header redundancy removal module 16 and/or additional functional modules 18 may include several modules to provide the header redundancy removal functionality. The modules in one embodiment include a tunneling module that establishes a tunnel with a tunneling client of a user equipment and a redundancy removal module for removing redundant information from frame headers.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
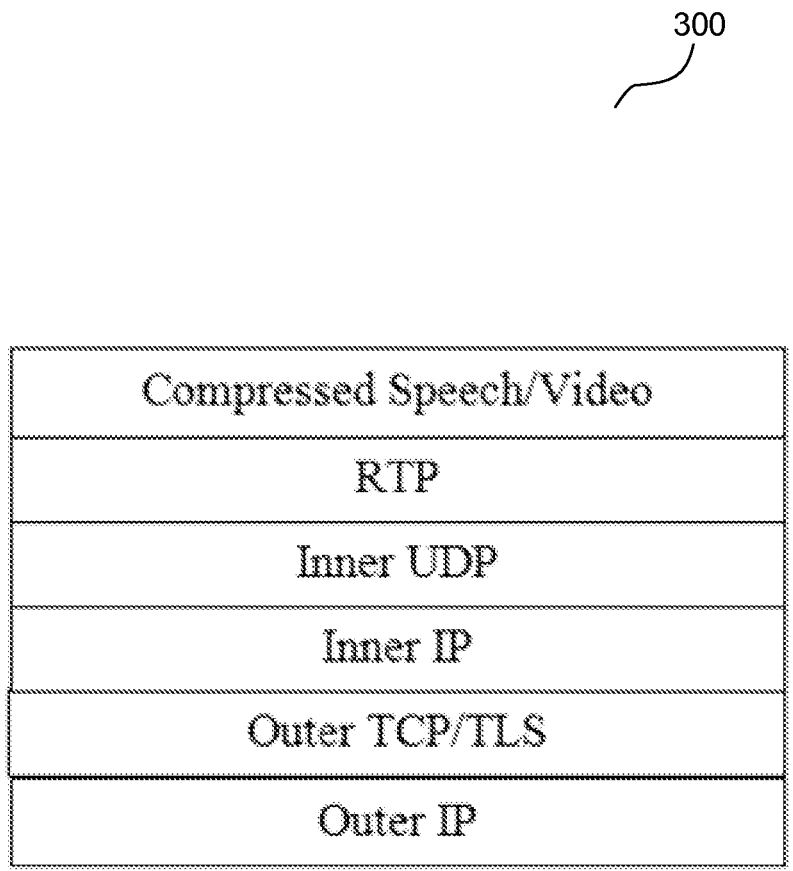
FIG. 3 illustrates example protocol layers in a Tunneled Services Control Function tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

As disclosed, encapsulated IP traffic includes a large amount of redundant information that may already be included as part of the tunnel transport. Known solutions to this problem do not take into account the knowledge by both tunneling client 106 and tunneling server 116 as with embodiments of the invention, and instead rely on computationally more complex compression methodologies that are not as efficient at reducing bandwidth consumption.

In contrast, embodiments take advantage of prior knowledge by both tunneling client 106 and tunneling server 116 and removes redundant header information, thus reducing the transmission rate and taking advantage of the available bandwidth at a very low computational cost.

In one embodiment, the functionality is negotiated on a per inner socket basis between tunneling client 106 and tunneling server 116 via a CM Service message exchange. Therefore, backward compatibility is provided between mismatching clients and servers. Once the header redundancy removal feature is enabled, both tunneling client 106 and tunneling server 116 remove some or all known IP header redundancy in the inner frames being encapsulated in one embodiment. Further, in one embodiment, once the header redundancy removal functionality is enabled, both tunneling client 106 and tunneling server 116 restore all known IP header redundancy in the inner frames being decapsulated.

In one embodiment, the header redundancy removal functionality is deactivated using a TSCF service request and a service response CM. If either the inner socket or the tunnel is removed, the functionality is automatically disabled. Further, one embodiment provides TSCF SDKs that support an application programming interface ("API") so that application 104 can enable header redundancy removal for a specific inner socket. For example, application 104 may enable header redundancy removal at tunneling client 106 for an inner socket by executing a corresponding "tsc_setsockopt" API (i.e., a set socket API) with a corresponding new socket option when an inner socket is created. The TSCF SDK provides a Berkeley software distribution ("BSD")-like socket API that can be used to send and receive encapsulated media using the tsc_sendto and tsc_recvfrom functions, respectively.

Figure 4:
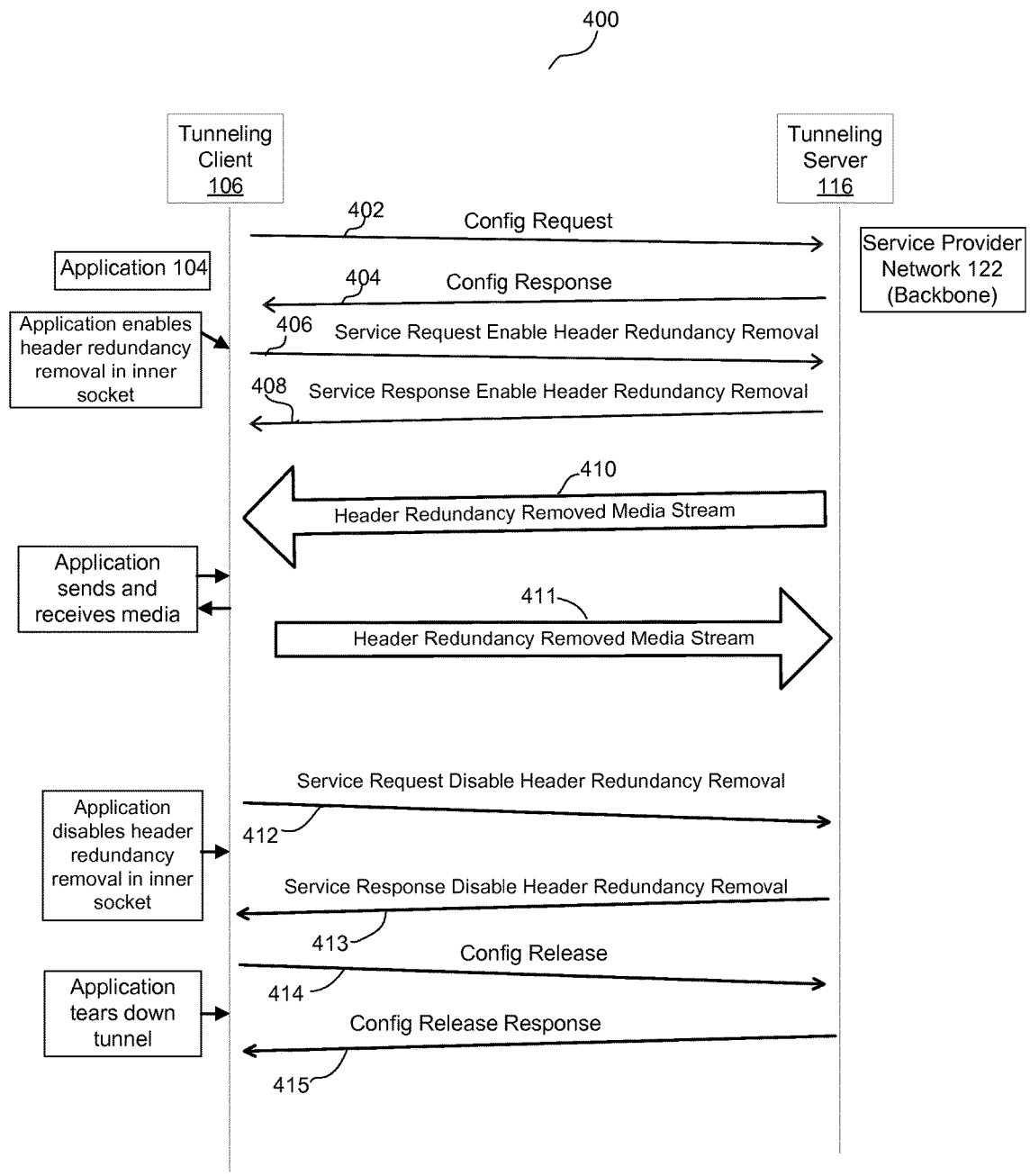
FIG. 4 is an example message sequence diagram for performing automatic header redundancy removal for tunneled encapsulated traffic according to some embodiments.

FIG. 4 is an example message sequence diagram 400, including the sequence of messages exchanged between tunneling client 106 and tunneling server 116, for performing automatic header redundancy removal for tunneled encapsulated traffic according to some embodiments. FIG. 4 includes network elements such as tunneling client 106 in communication with application 104, and tunneling server 116 in communication with service provider network 122, as described herein with reference to FIG. 1.

At 402, tunneling client 106 sends a configuration request message to tunneling server 116 to establish TSCF tunnel 108. At 404, tunneling server 116 responds to the configuration request message of tunneling client 106 with a configuration response message. Configuration request and response messages allow for tunneling client 106 to obtain configuration information for TSCF tunnel 108 from tunneling server 116, as described in, for example, 3GPP TR 33.830 V0.5.0. In one embodiment, from the application perspective, application 104 at UE 102 creates TSCF tunnel 108 by executing a "tsc_ctrl_new_tunnel" API, and the configuration response message is sent to tunneling server 116 in response to the execution of this API.

Upon completing the exchange of request/response messages, tunneling client 106 and tunneling server 116 may use TSCF tunnel 108 for performing RTC and communicating signaling traffic and media traffic. In one embodiment, when inner signaling and media sockets are needed to place a call (e.g., for communicating SIP call control traffic or RTP media traffic), application 104 creates these sockets on TSCF tunnel 108 by executing a "tsc_socket" API. A socket is created by determining a socket type (e.g., datagram vs. stream) and a tunnel on which the socket should be created. In one embodiment, when a socket is created, application 104 binds the socket by executing a "tsc_bind" API. The bind function assigns a specific transport port (e.g., TCP or UDP) to the socket. This port is later used as a source port of all traffic generated by the socket. In one embodiment, if an inner socket is created in TSCF tunnel 108, there is a binding at tunneling server 116 that links the internal IP address of TSCF tunnel 108 to that socket.

At 406, application 104 enables header redundancy removal functionality for a specific inner socket in TSCF tunnel 108 by executing a "tsc_setsockopt" API on the corresponding inner socket. The execution of a "tsc_setsockopt" API causes client header redundancy removal module 118 to send a TSCF service request message to tunneling server 116 to enable header redundancy removal functionality for the inner socket at tunneling server 116.

At 408, server header redundancy removal module 120 at tunneling server 116 receives the service request message, determines if tunneling server 116 can comply with the request, and answers back to client header redundancy removal module 118 with a TSCF service response message to confirm that header redundancy removal functionality is enabled.

At this point, both tunneling server 116 (at 410) and tunneling client 106 (at 411) send media (i.e., speech and/or video) frames with removed header redundancy using functionality described in more detail below. All frames sent on tunnel 108 are IP based frames/packets with corresponding IP headers.

If application 104 decides to disable the header redundancy removal functionality, it executes a new tsc_setsockopt on the corresponding inner socket and triggers renegotiation between tunneling client 106 and tunneling server 116 at 412 and 413.

The header redundancy removal functionality is also automatically disabled when application 104 tears down tunnel 108 by means of the tsc_delete_tunnel TSCF API. This causes tunneling client 106 to issue a configuration release at 414 that is responded back by tunneling server 116 with a configuration release_response at 415.

One embodiment supports header redundancy removal by providing: "Service_Type" TLV values to indicate header redundancy removal enablement and disablement; and a Connection_Info TLV to indicate source and destination transport as well as network endpoints of the detected unidirectional streams.

Table 1 below provides example TSCF TLVs for providing redundant traffic encoding functionality according to some embodiments.

has a value of 4. Header 501 further includes an Internet Header Length ("IHL") field, a Type of service ("ToS") field, a total length field, an identification field, flags that are used to control or identify fragments and a fragment offset field.

Header 501 further includes a Time To Live ("TTL") field, a protocol field and a header checksum. Finally, header 501 includes the source address and the destination address.

The "after" redundancy removal IPv4 header in accordance with one embodiment is shown at 502. In one embodiment, the automatic removal of header redundancy applies to smaller media frames that are not affected by fragmentation, exhibit real time quality of service and have a source address that is the internal IP address of tunnel 108. Under these conditions, the only needed fields for the IPv4 are the version field, the total length field, the protocol field, the ToS field and the destination address. The remaining fields can be removed. The header checksum field is not needed since the tunnel outer transport layer provides reliability and because media frames are smaller than other frames. Further, the total length field needs to be only a 12-bit field, as opposed to a 16-bit field as specified by IPv4. The IP header compression for IPv4 achieved by embodiments by removing fields is approximately 60%. The "4" is changed to "5" to differentiate between IPv4 and IPv6.

Figure 6:
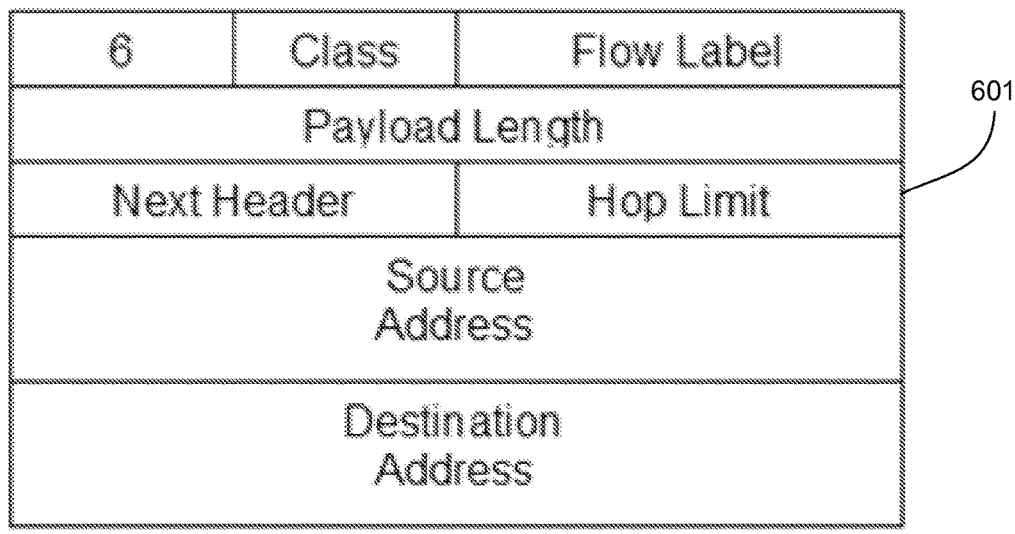
FIG. 6 illustrates an embodiment where the inner transport is IPv6 based.
Figure 6:
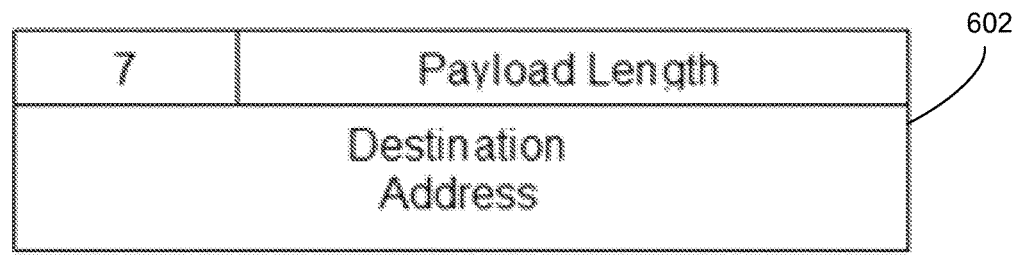

FIG. 6 illustrates an embodiment where the inner transport is IPv6 based. A "before" redundancy removal IPv6 header is shown at 601 and includes a version field that has a value of 6 for IPv6. The IPv6 header further includes a traffic class, a flow label, a payload length, a next header and a hop limit. The traffic class and flow label fields are used to identify the type of data (e.g., real-time media or some other type of data). The IPv6 header further includes a source address and a destination address.

The "after" redundancy removal IPv6 header in accordance with one embodiment is shown at 602. All fields are removed except for the version field (which is changed to 7 to differentiate from the IPv6 header and the IPv4 header), the payload length and the destination address. The IP header compression for IPv6 achieved by embodiments by removing fields is approximately 52%.

In one embodiment, header redundancy removal is requested by application 104 via tsc_socket APIs, more

TABLE 1

| TLV TYPE | | | SHORT/ | VALUE | | |
|---|---|---|---|---|---|---|
| NAME | VALUE | SEMANTICS | LONG FORMAT | TYPE | LENGTH | NOTES |
| Connection_Info_IPv4 | 24 | Client Connection Info | Short | Octet string | | |
| Connection_Info_IPv6 | 25 | Client Connection Info | Short | Octet string | | |
| Service_Type | 27 | Service Type | Short | Unsigned integer | 1 byte | Enable Header Removal = 76 Disable Header Removal = 77 |

Figure 5:
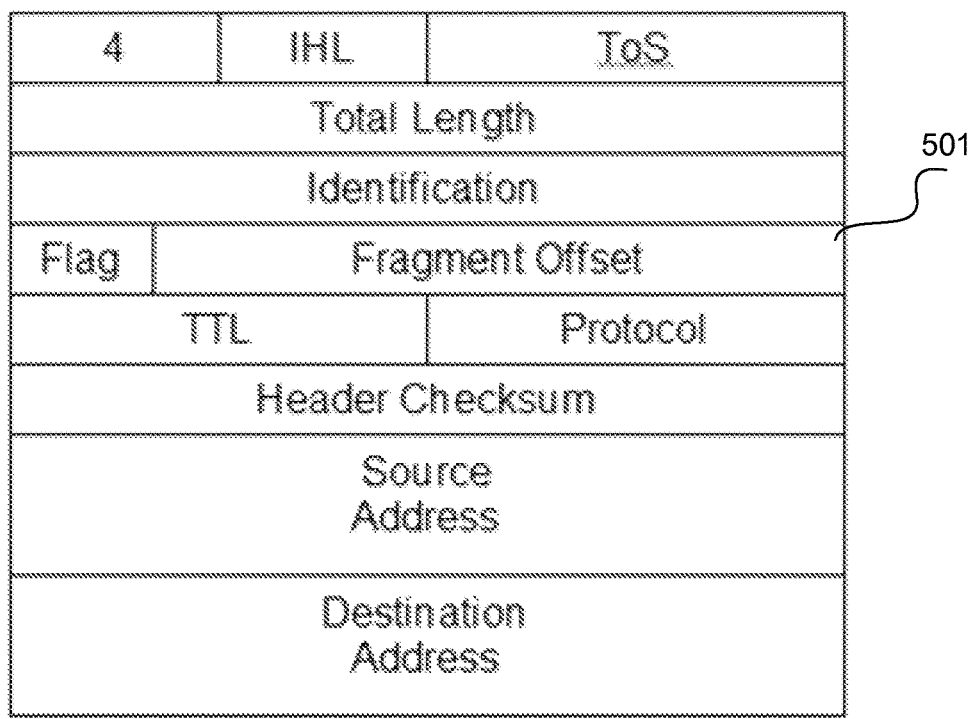
FIG. 5 illustrates an embodiment where the inner transport is IPv4 based.
Figure 5:
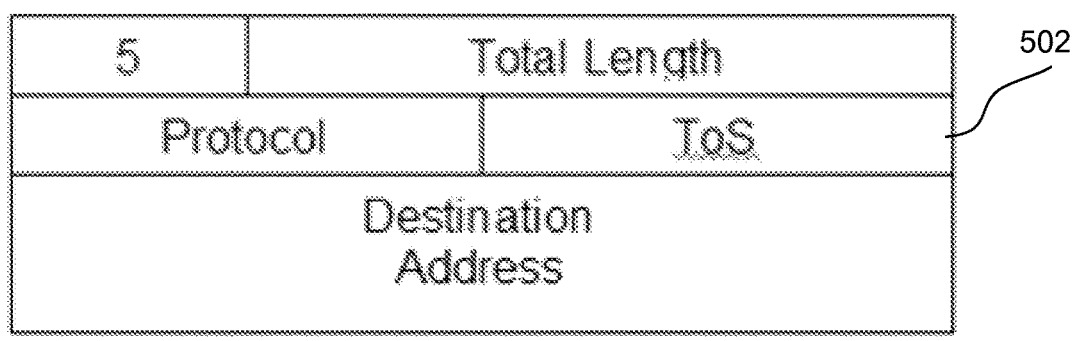

One embodiment removes redundancy header information from an IP header. FIG. 5 illustrates an embodiment where the inner transport is IPv4 based. A "before" redundancy removal IPv4 header is shown at 501 and includes several fields intended to support fragmentation as well as different levels of quality of service and source addresses. Header 501 include a four-bit version field. For IPv4, this specifically by setting the appropriate socket option in the SDK using example pseudocode as follows:

int hhr=1
    int result=tsc_setsockopt(rtp_socket, SOL_SOCKET, SO_TSC_HRR, (char*)&hrr, sizeof(int)); where the "hhr" integer controls whether the feature is enabled (hrr=1) or not (hrr=0). If tsc_setsockopt returns −1 the option was not set correctly. If it returns 0, it was set correctly but support is not enabled until it is fully negotiated between tunneling client 106 and tunneling server 116. A new notification "tsc_notification_hrr" is added to notify tunneling client 106 when this negotiation is terminated. The following example pseudocode shows how the notification is enabled and what the notification callback function looks like:

```
tsc_notification_enable(handle, tsc_notification_hhr,
hhr_notification, NULL);
void hrr_notification(tsc_notification_data *notification)
{
  tsc_notification_hrr_info_data *hrr_data =
  (tsc_notification_hrr_info_data *)notification->data;
  if (hrr_data && hrr _data->available == tsc_bool_true) {
    if (hrr _data->enabled == tsc_bool_true) {
      printf("HRR notification enabled on socket %d\n", hrr_data->socket);
    } else {
      printf("HRR notification disabled on socket %d\n",
        hrr _data->socket);
    }
  } else {
    printf("HRR notification not allowed on socket %d\n",
      hrr _data->socket);
  }
}
```

The fourth NULL parameter in tsc_notification_enable is an opaque/private data pointer that can be recovered in the tsc_notification_data structure upon callback.

One embodiment that is implemented using an SBC, such as the Acme Packet 6300 from Oracle Corp., provides a configuration object "tscf-interface" that includes a keyword "HRR" that enables the header redundancy removal functionality. Table 2 below provides an example of the tscf-interface configuration object according to one embodiment.

TABLE 2

| Parameter Name | Extensible markup language ("XML") tag | Data Type and Default | Value Ranges/Possible Values | Required or Optional (for feature to work)? |
|---|---|---|---|---|
| assigned-services | assigned-services | String: blank | HRR to enable header redundancy removal | Optional |

The following functionality provides an example interface configuration for providing header redundancy removal according to one embodiment:

```
tscf-interface
  realm-id              access
  state                 enabled
  max-tunnels           1000
  local-address-pools   Ip
  assigned-services     SIP,HRR
  tscf-port
    address             192.168.31.11
    port                2105
    transport-protocol  TCP
    tls-profile
    rekey-profile
  last-modified-by      admin@console
  last-modified-date    2015-06-01 05:00:00
```

The following is an example extensible markup language ("XML") functionality for providing redundant encoding according to one embodiment:

```
<tscfInterface realmID='access'
  state='enabled'
  maxTunnels='1000'
  assignedServices='SIP,HRR'
  options=''
  lastModifiedBy='admin@console'
  lastModifiedDate='2015-06-01 05:00:00'
  objectId='59'>
  <key>access</key>
  <localAddressPool name='Ip'/>
  <tscfPort address='192.168.31.11'
    port='2105'
    transProtocol='TCP'
    tlsProfile=''
    rekeyProfile=''
</tscfInterface>
```

Figure 7:
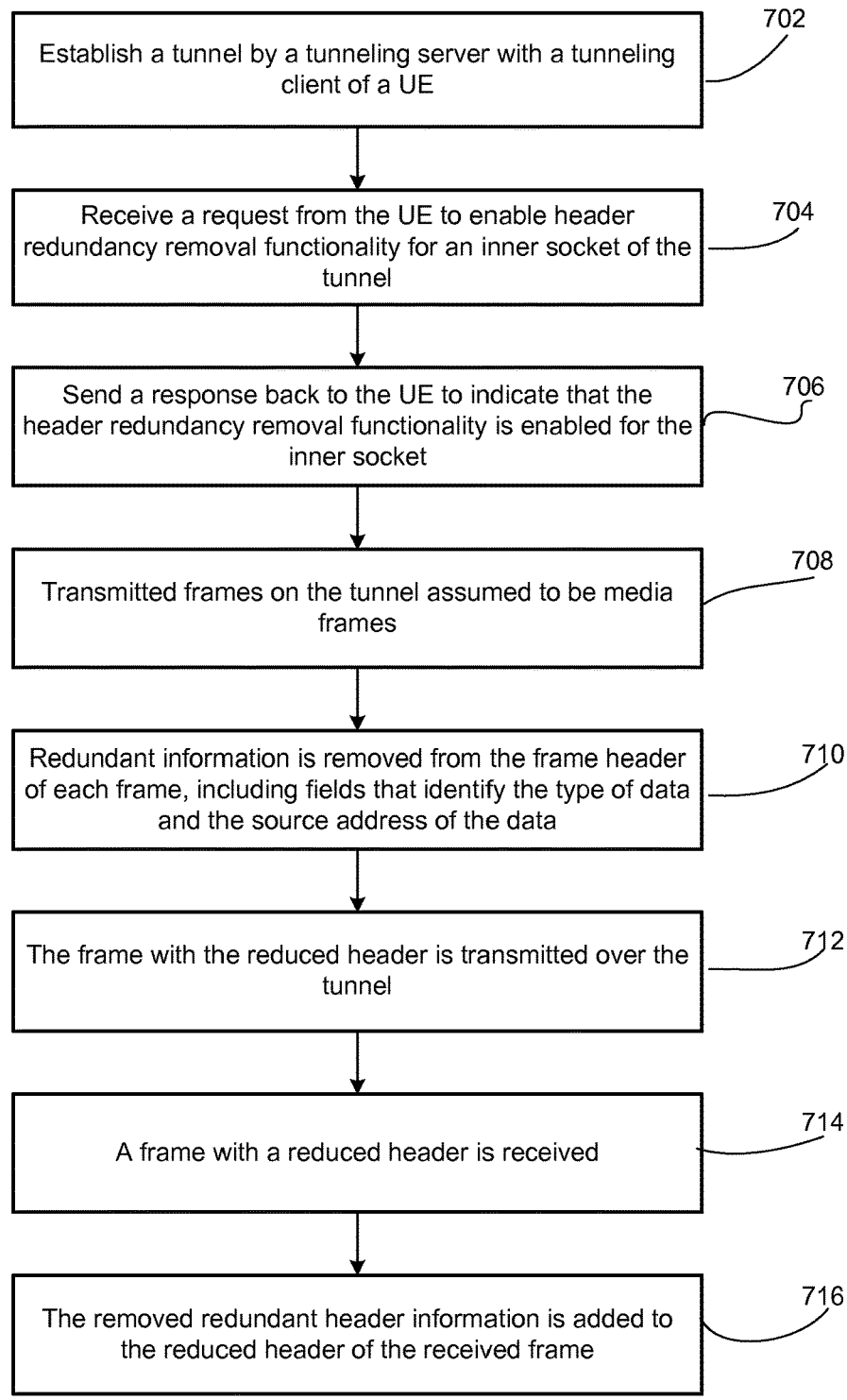
FIG. 7 is a flow diagram of the header redundancy removal module of FIG. 2 and/or the tunneling client and the tunneling server of FIG. 1 when performing header redundancy removal in accordance with embodiments of the present invention.

FIG. 7 is a flow diagram of header redundancy removal module 16 of FIG. 2 and/or tunneling client 106 and tunneling server 116 of FIG. 1 when performing header redundancy removal in accordance with embodiments of the present invention. In one embodiment, the functionality of the flow diagram of FIG. 7 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 702, tunneling client 106 and tunneling server 116 establish TSCF tunnel 108. Tunnel 108 can include multiple inner sockets, such as a separate inner socket for speech data, video data, etc.

At 704, client header redundancy removal module 118 at tunneling client 106 sends a TSCF service request to tunneling server 116 to enable header redundancy removal functionality for a specific inner socket in TSCF tunnel 108. In one embodiment, client header redundancy removal module 118 sends the request when application 104 executes an API to enable the header redundancy removal functionality for the inner socket. A request can be made for any or all inner sockets of tunnel 108, but the functionality is implemented on a per socket basis.

At 706, server redundant encoding module 120 at tunneling server 116 sends a TSCF service response back to client header redundancy removal module 118 to confirm that header redundancy removal functionality is enabled for the inner socket. At this point, encapsulated frames are transmitted across tunnel 108 on the enabled inner socket. The frames are assumed to be IP based media (i.e., speech and/or video) frames having either an IPv4 or IPv6 header. The functionality is enabled by application 104 on a per socket basis. These sockets are typically used for media transmission that is fairly intensive and have a large amount of overhead due to an excessive number of headers. The header redundancy removal functionality can be implemented at either of tunneling client 106 and tunneling server 116 or at both servers.

At 708, for each frame transmitted, the size of the frame and the internal address of the frame are assumed to be media frames. Embodiments assume that the frames are comprised of low-latency media frames and treat them accordingly. Consequently, embodiments assume that each frame is a "smaller" media frame that is not affected by fragmentation, exhibits real time quality of service, and has a source address that is the internal IP address. However, if a frame is too "large" (i.e., subject to fragmentation), those frames are directly transmitted without redundancy removal, so the size of the frame is checked in one embodiment before redundancy removal.

At 710, redundant information is removed from the frame header. For IPv4 headers, all fields except the version field, the total length field, the protocol field, the ToS field and the destination address can be removed. For IPv6 headers, all fields except the version field, the payload length and the destination address can be removed. Therefore, among the fields that are removed are the fields that identify the type of data and the source address of the data.

At 712, the frame with the reduced header is transmitted over TSCF tunnel 108.

At 714, a frame with a reduced header is received.

At 716, the removed redundant header information is added to the reduced header. The fields are filled/added with the assumption that the frame forms part of a media stream, so the corresponding fields that were previously removed from such a frame are restored.

The functionality at 712, 714 and 716, if performed on the same frame as the preceding functionality, is done by tunneling server 116 if the frame was transmitted by tunneling client 106, or vice versa.

As disclosed, embodiments remove header information for media frames that are transmitted over an inner socket of a tunnel. The removal improves bandwidth efficiency (i.e., the ratio between payload and headers) at a computational complexity much lower than that of other standard lossless compression schemes. Further, the more efficient use of the available bandwidth allows for more clients to connect simultaneously.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to transmit frames, the transmitting comprising:
    establishing a tunnel between a tunneling client of a user equipment (UE) and a tunneling server;
    enabling a redundant header removal functionality for an inner socket of the tunnel;
    receiving a first frame, the first frame comprising an Internet Protocol (IP) header and comprising speech and/or video data;
    before the first frame is transmitted over the tunnel, at the tunneling server checking a size of the first frame and when the size of the first frame is small enough not to be subject to fragmentation removing redundant information from the IP header, the removed redundant information comprising a first source address of the first frame and a first identity of a type of data of the first frame;
    transmitting the first frame with a modified header after the removed redundant information over the inner socket of the tunnel from the tunneling server to the tunneling client;
    receiving at the tunneling server a second frame with a reduced header from the inner socket of the tunnel, the reduced header having a removed second source address and a removed second identity of a type of data of the second frame; and
    adding information to the reduced header, the information comprising the removed second source address and the removed second identity of the type of data of the second frame.

2. The computer readable medium of claim 1, wherein a request to enable the redundant header removal functionality is received from an application programming interface (API) executed by an application on the UE.

3. The computer readable medium of claim 1, further comprising:
    before a third frame comprising speech and/or video data is transmitted over the tunnel, at the tunneling server checking a size of the third frame and when the size of the first frame is subject to fragmentation, not removing redundant information from the third frame; and
    transmitting the third frame over the inner socket of the tunnel from the tunneling server to the tunneling client.

4. The computer readable medium of claim 1, wherein the tunnel is configured according to a tunneled services control function (TSCF) standard and has an internal IP address, and the first frame comprises a source address that is the internal IP address.

5. The computer readable medium of claim 1, wherein the IP header comprises one of an IPv4 header or an IPv6 header.

6. The computer readable medium of claim 1, wherein the tunnel comprises a plurality of inner sockets and the redundant header removal functionality is not enabled for at least one of the inner sockets.

7. The computer readable medium of claim 1, wherein the first frame comprises real-time speech data.

8. A method of transmitting frames, the method comprising:
    establishing a tunnel between a tunneling client of a user equipment (UE) and a tunneling server;
    enabling a redundant header removal functionality for an inner socket of the tunnel;
    receiving a first frame, the first frame comprising an Internet Protocol (IP) header and comprising speech and/or video data;
    before the first frame is transmitted over the tunnel, at the tunneling server checking a size of the first frame and when the size of the first frame is small enough not to be subject to fragmentation removing redundant information from the IP header, the removed redundant information comprising a source address of the first frame and a first identity of a type of data of the first frame;
    transmitting the first frame with a modified header after the removed redundant information over the inner socket of the tunnel from the tunneling server to the tunneling client;
    receiving at the tunneling server a second frame with a reduced header from the inner socket of the tunnel, the reduced header having a removed second source address and a removed second identity of a type of data of the second frame; and
    adding information to the reduced header, the information comprising the removed second source address and the removed second identity of the type of data of the second frame.

9. The method of claim 8, wherein a request to enable the redundant header removal functionality is received from an application programming interface (API) executed by an application on the UE.

10. The method of claim 8, further comprising:
before a third frame comprising speech and/or video data is transmitted over the tunnel, at the tunneling server checking a size of the third frame and when the size of the first frame is subject to fragmentation, not removing redundant information from the third frame; and
transmitting the third frame over the inner socket of the tunnel from the tunneling server to the tunneling client.

11. The method of claim 8, wherein the tunnel is configured according to a tunneled services control function (TSCF) standard and has an internal IP address, and the first frame comprises a source address that is the internal IP address.

12. The method of claim 8, wherein the IP header comprises one of an IPv4 header or an IPv6 header.

13. The method of claim 8, wherein the tunnel comprises a plurality of inner sockets and the redundant header removal functionality is not enabled for at least one of the inner sockets.

14. The method of claim 8, wherein the first frame comprises real-time speech data.

15. A tunneling server comprising:
a processor; and
a storage device coupled to the processor that stores a header redundancy removal module, the header redundancy removal module, when executed by the processor, implementing modules comprising:
a tunneling module that establishes a tunnel by a tunneling server with a tunneling client of a user equipment (UE) and, in response to receiving a request from the UE to enable redundant header removal for an inner socket of the tunnel, sends a response back to the UE to indicate that the redundant header removal is enabled for the inner socket; and
a redundancy removal module that receives a first frame comprising an Internet Protocol (IP) header and comprising speech and/or video data, before the first frame is transmitted over the tunnel, checks a size of the first frame and when the size of the first frame is small enough not to be subject to fragmentation removes redundant information from the IP header, the removed redundant information comprising a first source address of the first frame and a first identity of a type of data of the first frame, transmits the first frame with a modified header after the removed redundant information over the inner socket of the tunnel, receives at the tunneling server a second frame with a reduced header from the inner socket of the tunnel, the reduced header having a removed second source address and a removed second identity of a type of data of the second frame, and adds information to the reduced header, the information comprising the removed second source address and the removed second identity of the type of data of the second frame.

16. The tunneling server of claim 15, wherein a request to enable the redundant header removal is received from an application programming interface (API) executed by an application on the UE.

17. The tunneling server of claim 15, wherein the first frame is formed of media data.

18. The tunneling server of claim 15, wherein the tunnel is configured according to a tunneled services control function (TSCF) standard and has an internal IP address, and the first frame comprises a source address that is the internal IP address.

19. The tunneling server of claim 15, wherein the IP header comprises one of an IPv4 header or an IPv6 header.

20. The tunneling server of claim 15, wherein the first frame comprises real-time speech data.

\* \* \* \* \*